Figure 1:
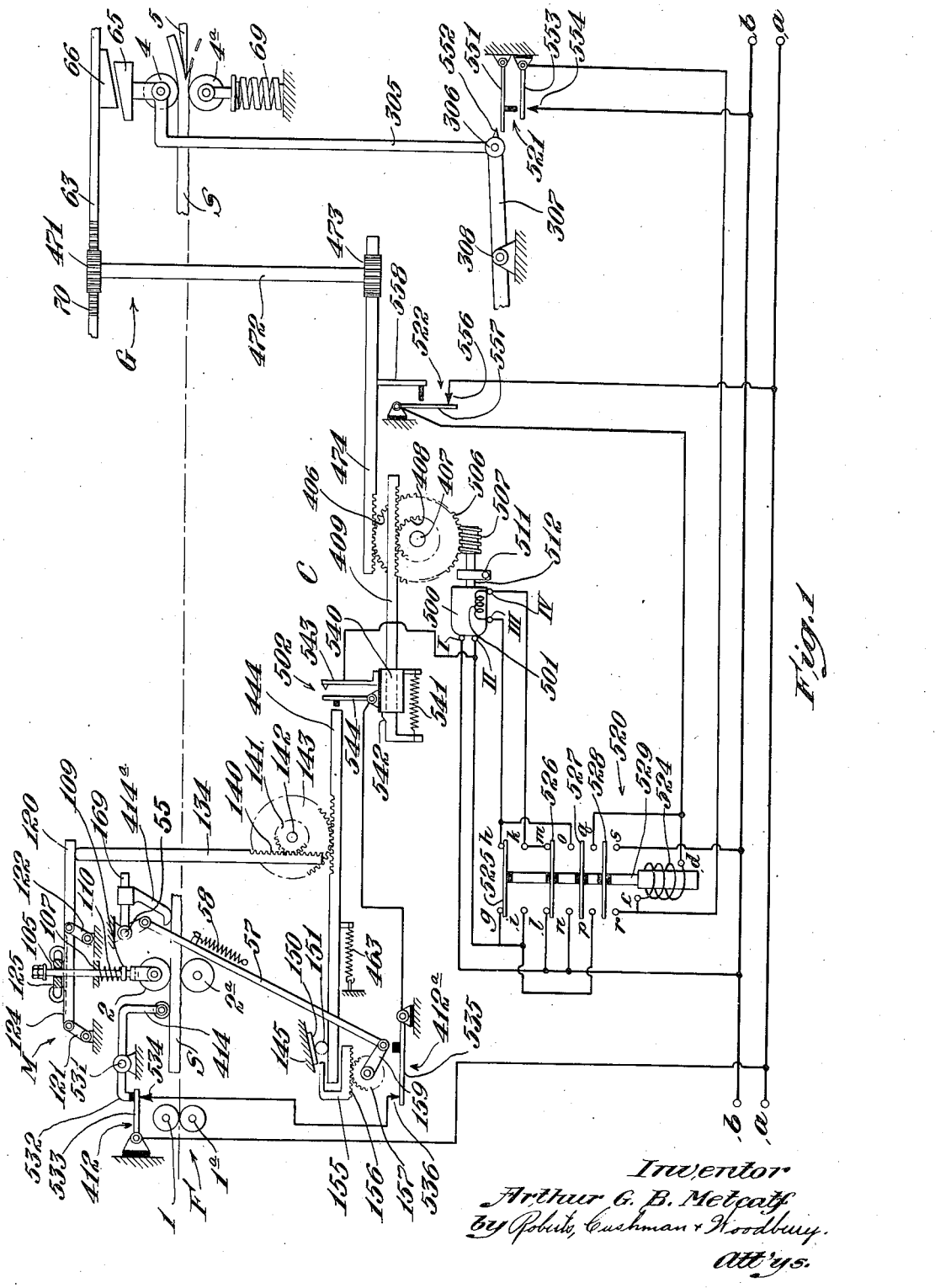

Oct. 24, 1944.  A. G. B. METCALF  2,360,884
GRADING MACHINE
Filed June 21, 1941  3 Sheets-Sheet 1

Inventor
Arthur G. B. Metcalf
by Roberts, Cushman & Woodbury.
Att'ys.

Oct. 24, 1944. A. G. B. METCALF 2,360,884
GRADING MACHINE
Filed June 21, 1941 3 Sheets-Sheet 2

Inventor
Arthur G. B. Metcalf
by Roberts, Cushman Woodbury
Att'ys.

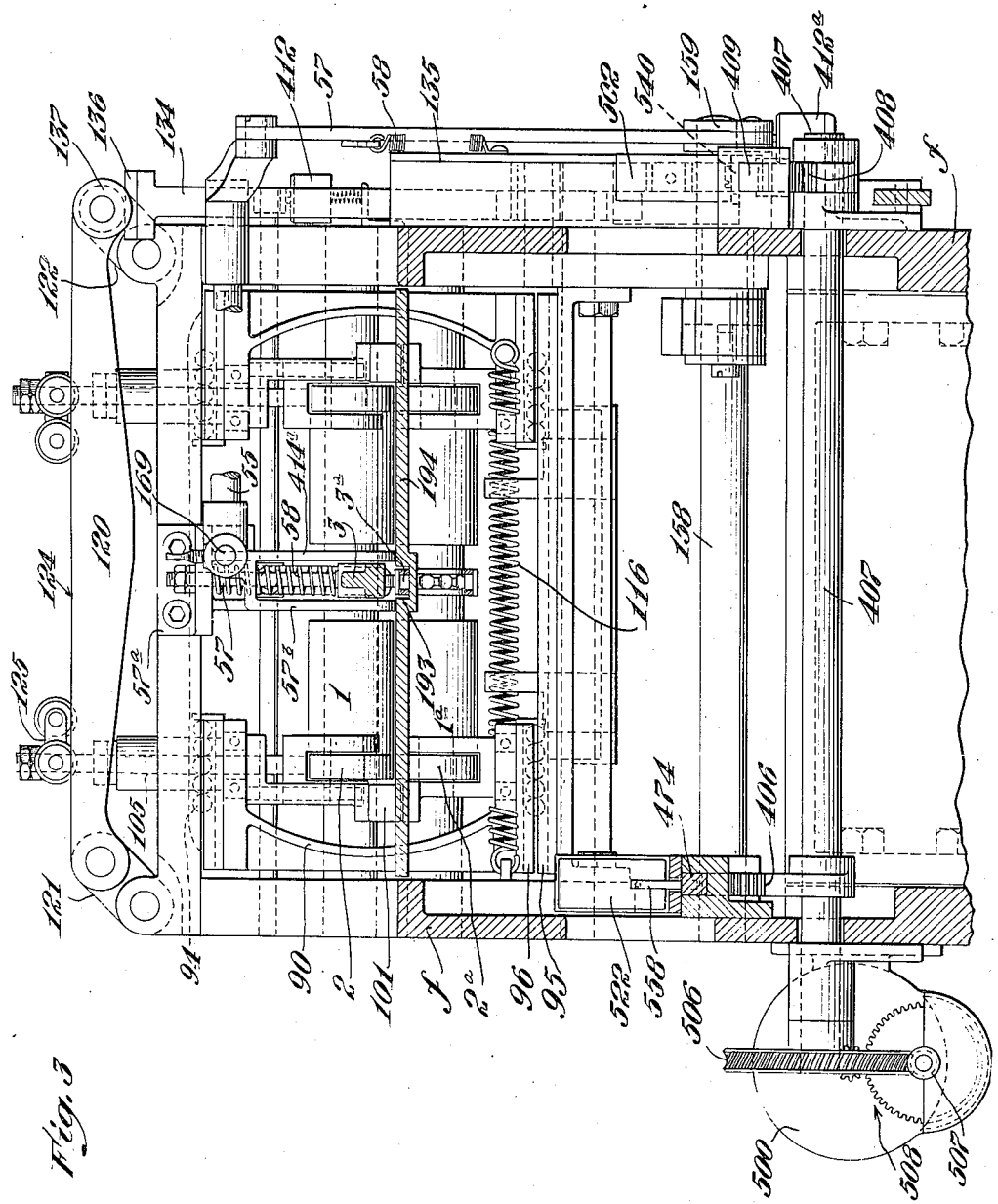

Patented Oct. 24, 1944

2,360,884

UNITED STATES PATENT OFFICE 2,360,884

GRADING MACHINE

Arthur G. B. Metcalf, Milton, Mass., assignor to North American Holding Corporation, Syracuse, N. Y., a corporation of New York Application June 21, 1941, Serial No. 399,087

8 Claims. (Cl. 69—11)

This invention relates to grading machines such as are used to grade shoe soles, taps and other blanks of stock used in the manufacture of shoes, and more particularly to the well-known Nichols type of grading machines illustrated in a series of patents granted to Elmer P. Nichols, Leander A. Cogswell, and James W. Johnston, of which the Johnston Patent No. 2,187,304, dated January 16, 1940, may be referred to as an example. A characteristic feature of such grading machines is that each blank is measured and graded in accordance with the thickness of the thinnest spot of the blank, or of a selected area of the blank, as determined by the detecting and measuring devices.

There are various kinds of grading operations performed by different species of grading mechanisms, and the term "grading," as established in this art, is a generic term and includes evening or skiving the blank as a whole down to the grade or thickness of its thinnest spot, stamping or marking each blank with a character indicating its thickness grade, indicating on a visual indicator the grades of the several blanks, and sorting or distributing the blanks in accordance with their grade measurements. Two or more species of grading mechanisms may be and commonly are contained in one machine and the term "grading" is used herein in its generic sense unless some particular kind of grading is specified. Whatever may be the kind or kinds of grading to be performed the appropriate grading mechanism or mechanisms are adjusted through setting and transmission apparatus in response to and in accordance with the thickness grade of each blank as determined by the detecting and gauging or measuring device, which acts on each blank as successive blanks are passed one by one through the machine. The measurements are usually made in terms of "irons" (1/48 of an inch), and the measurement transmitted to the grading devices is usually the thickness measurement in irons or fractions of irons which is nearest to but not greater than the thickness of the thinnest part of the blank as determined by the measuring device. In the machine herein illustrated two types of grading mechanism are shown, namely a visual indicator and an evening or skiving mechanism, but it will be understood that additional or different species of grading mechanisms might be used, such as stamping or marking mechanism or distributors, and all such species are within the scope of the claims.

Grading machines of the aforesaid type usually include measurement transmitting devices which involve translating a linear dimension or movement into a rotational or angular movement, thus introducing the usual cosine error, the magnitude of which depends upon the degree of amplification of the transmitted measurement and the range of thickness measurements which the machine is capable of measuring. Although it is possible to compensate for such errors, either by elaborate geometrical means or mechanically, as shown for example in United States Patent No. 2,180,591, both methods are complicated and add appreciably to the cost of manufacture of the machine, the latter method being subject to the further objection that it increases appreciably the mass of moving parts. Improved apparatus overcoming the aforementioned objectionable features and providing a grading machine which is capable of accurately measuring to any desired degree of precision the thickness of sheet material over a given range of thickness, without necessitating adjustment or substitution of parts, etc., is shown for example in my copending application Serial No. 366,853, filed November 23, 1940.

The aforementioned arrangements are purely mechanical and have certain disadvantages inherent in such devices. For example, the measuring and grading mechanisms are mechanically interconnected, which involves rather complicated linkages and transmissions exerting more or less disturbing reactive forces upon the several component mechanisms introducing unavoidable bulkiness and limiting the grading speed which can be attained.

Systems of this type are improved according to my copending application Serial No. 389,854, filed April 23, 1941, by separating so far as mechanical force transmission is concerned, the measuring and grading mechanisms by introducing a member controlled by and responsive to the measuring mechanism and a grading control mechanism which has its own power supply and which is correlated to the controlled member for the purpose of moving the grading mechanism into proper positions after that position has been determined by that member.

The principal object of the present invention is further to improve systems of this type by continuously correlating the measuring and grading mechanisms to proportionate settings, the position of the controlled grading mechanism being derived from corresponding positions of the controlling, measuring or detecting mechanism without any mechanical force transmission therebetween.

In another aspect, the invention has the object of providing a grading mechanism having its own motive power which moves it into positions determined by such positions of the measuring mechanism which correspond to extreme, as for example minimum values of the article to be measured. According to a further aspect of the invention, the grading mechanism is not, at the end of the measuring operation, set to a certain value determined at some time during that operation, but follows the measuring operation so that, at the end of the latter, it is already in proper position for grading. In still another aspect, the invention has the object of providing electric apparatus for continuously setting a dependent mechanism to values corresponding to extreme values of a controlling mechanism, the apparatus providing power for moving the dependent mechanism independently of the power moving the controlling mechanism. Also in blank grading machines of the type described herein by way of example it is especially easy to provide for measuring of only a certain preselected portion of the blank.

Figure 2:
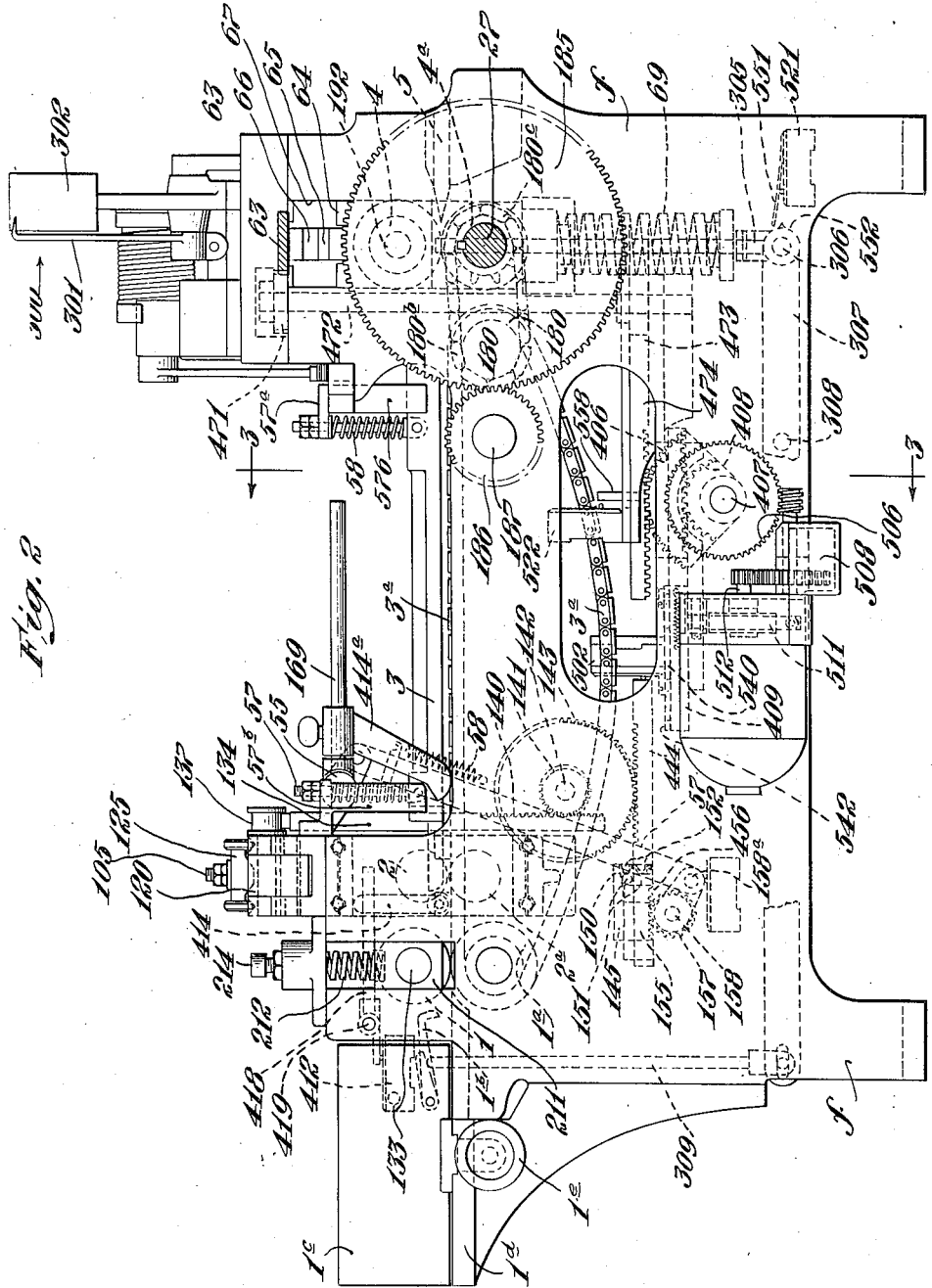

Further objects relate to various features of construction and will be apparent from a consideration of the following description and the accompanying drawings wherein Fig. 1 is a diagrammatical representation of a grading machine described by way of example, including the electrical circuit;

Fig. 2 is a side elevation of the embodiment of a grading machine schematically shown in Fig. 1, as constructed in accordance with the present invention and including a grading mechanism; and Fig. 3 is a section on line 3—3 of Fig. 2.

The machine to be described by way of example of a device according to the invention comprises several apparatus groups, indicated as follows in Fig. 1. The blanks S are supplied to the machine proper by a feeding arrangement F, they then pass through a measuring device M, and are graded by a grading mechanism G; measuring and grading devices are correlated by a transmission apparatus C.

*Feeding arrangement and drive.*—The blanks S, as for example shoe soles, are positively delivered to the measuring device M by a pair of continuously driven feed rolls 1, 1ª (Figs. 1 and 2). These blanks may be automatically supplied to the feed rolls by appropriate arrangements, as for example from a hopper from the bottom of which they proceed forwardly one at a time. Such a feeding arrangement is, for example, described in the above-mentioned copending application Serial No. 366,853, but not shown in detail herein, since the feeding of the blanks is not an essential feature of the present invention. In the embodiment herein described it is assumed that the blanks are fed by hand, an interlocking device with hook 1ᵇ (Fig. 2) preventing the feeding of a new blank before the one just measured has been discharged. Hook 1ᵇ is lifted by a mechanism to be described below with reference to the grading mechanism. The side walls 1ᶜ of feeding platform 1ᵈ can be adjusted to the width of the blanks by means of a screw spindle on hand wheel 1ᵉ.

The blank then proceeds through the measuring device M with calipering rolls 2 and 2ª, which device will be described in detail below. Upon emergence from these rolls, the blank is confined between a presser bar 3 (Figs. 2 and 3) and a continuously driven conveyor chain 3ª passing over lower feed roll 1ª and a sprocket 180ª on driven shaft 180. The presser bar is held downwardly by springs 58 on rods 57 linked at one end to the bar whereas the other end is free to pass through bracket 57ª fastened to the frame. The presser bar is confined to vertical movement by guide bars 57ᵇ (Figs. 2 and 3) likewise fastened to frame *f*.

On its way between feed rolls 1, 1ª and measuring rolls, the blank passes a stop grader feeler 414 which operates a control switch 412 (Figs. 1 and 2) and is adjustably mounted on a rod 418 (Fig. 2) pivoted at 419. After having passed the measuring rolls, the leading edge of the blank encounters a start grader feeler 414ª operating a switch 412ª (Fig. 3), and is then by the conveyor delivered to the rolls 4 and 4ª of the grading device G. The start grader feeler 414ª is adjustably fastened to a rod 169 rocking on shaft 55 (Fig. 2).

The conveyor chain 3ª is driven by a sprocket wheel (not shown) at the rear of the machine, on a transverse shaft 180 (Fig. 2), on which is also fixed a second sprocket wheel 180ᵇ connected by a chain 180ᶜ with a sprocket wheel fast on shaft 27 (Fig. 2) of the lower skiving roll 4ª. Shaft 27 also has fixed to it a large gear wheel 185 (Fig. 2) which is driven by another gear wheel 186 fast on shaft 187. Shaft 187 is the continuously driven main shaft of the machine.

The main shaft 187 has also fixed to it a gear (not shown) driving shaft 192 of the upper skiving roll 4 (Fig. 2). The upper horizontal stretch of the conveyor chain 3ª occupies a groove or channel 193 of the bed plate 194 (Fig. 3) which supports the chain. The end of this plate toward the measuring devices has a narrow extension between the two calipering casters, its free end projecting close to the feed rolls 1 and 1ª so that the horizontal stretch of chain 3ª is supported throughout approximately its entire length, as more fully shown in United States Patent No. 2,187,204.

The shaft 133 of the upper feed roll 1 (Fig. 2) is journaled in boxes 211 sliding in vertical ways provided on the frame of the machine, these boxes being yieldingly urged downwardly by springs 212. The upper ends of these springs bear against adjustable abutment screws 214. The continuously driven shaft of the lower feed roll 1ª is journaled in fixed bearings on the frame of the machine and carries gears which mesh with driving gears on shaft 133 of the upper feeding roll.

*Measuring device.*—From feeding rolls 1, 1ª the blank passes, as above mentioned, between the calipering rolls 2, 2ª of a measuring mechanism.

The measuring mechanism herein shown by way of example is likewise described in detail in copending application Serial No. 366,853, so that it is herein only necessary to describe it as far as it is essential to the present invention.

The measuring mechanism M comprises a pair of yokes 90 (Fig. 3) mounted on frame *f* for travel transversely thereof on four races with balls 94 running in grooves 95 and 96 of frame and caliper yokes, respectively (Fig. 3).

The yokes have lower calipering rolls 2ª, upper calipering rolls 2, and edge rolls 101, these rolls being supported on a bracket which is mounted on its yoke for rotation about a vertical axis and permits up and down movement of the upper calipering roll 2, on a spindle 105 which projects upwardly through appropriate slots of the machine frame. Spindle springs 110 arranged between collars 109 of spindles 105 and rests 107 of yokes 90 (Fig. 1), urge rolls 2 downwardly against the blank, and the edge rolls 101 are urged inwardly by springs 116 (Fig. 3).

Spindles 105 carry at their upper ends three-wheeled rotatable carriages 125 running on grooves 124 of a transverse measuring bridge 120 (Figs. 1, 2 and 3) which, together with links 121 and 122 and the machine frame to which these links are journaled, forms a four-bar parallel linkage system. Bridge 120 is at all times parallel to the path of the calipering yokes, irrespective of its upward and downward movement following the thickness variations of a blank S passing between rolls 2 and 2ª. The spindles 105 can move upwardly through carriage 125 without lifting the latter, but downward movement of either spindle under the influence of the above-mentioned spindle springs 110 urging the rolls 2 downwardly against the blank, will be transmitted to bridge 120, which cannot be lifted, or held in position by spindle 105 and the calipering rolls.

The downward movement of the bridge 120 affects a vertical push bar 134 mounted in guideways in the frame. The upper end of the bar 134 has a flat head 136 (Fig. 3) engageable with a roller 137 mounted on bridge 120. The lower end of the bar 134 has teeth 140 which mesh with pinion 141 on shaft 142 (Fig. 1). The pinion 141 is secured to gear 143 which meshes with the teeth of rack 444, which constitutes a switch control bar and is slidably mounted in suitable guideways of the frame. A tension spring 463 (Fig. 1) urges the bar 444 toward the left of Fig. 1, consequently holding the head 136 of bar 134 against the roller 137 of bridge 120, thus eliminating play within the transmission mechanism.

During the measuring of the blank by the calipering rolls the two spindles 105 will move up and down in response to differences in thickness of different parts of the blank but owing to the fact that (due to the arrangement of spindle 105) only downward movement is transmitted to the bridge 120 and associated parts, the control bar 444, constituting a setting mechanism, can only be adjusted in response to successively thinner spots encountered by the calipering rolls.

Movement of the bar 444 to the right (Figs. 1 and 2) is in direct proportion to the maximum downward movement of the calipering roll 2 and hence corresponds to the measurement of the thinnest part of the measured blank. Since it is desired to preserve only the thinnest measurement, corresponding to the maximum movement of bar 444 to the right of Fig. 1, means are provided to lock bar 444 against movement toward the left in response to thicker areas of the sole, during the period required to measure and grade soles passing through the machine, as follows.

The frame wall has a chamber 135 (Fig. 3) through which the left-hand end (Fig. 1) of bar 444 projects. A block 145 is mounted within this chamber and has tapered inner wall surfaces indicated at 150 (Figs. 1 and 2), rollers 151 being interposed between the inclined surfaces 150 and the adjacent faces of the bar 444. Small leaf springs 152 (Fig. 2) normally hold the rollers 151 against the inclined surfaces 150, thus locking the bar 444 against movement toward the left of Fig. 1, due to the wedging action of the inclined surfaces. The bar 444 is therefore free to move toward the right of Fig. 1 in response to downward movement of the calipering rolls 2, but is locked against movement toward the left of Fig. 1 so long as the rollers are in contact with the inclined surfaces and the upper and inner faces of the bar 444.

In order to release the bar 444 it is merely necessary to disengage the rollers from the inclined surfaces, and to this end there is provided a release bar 155 (Figs. 1 and 2), the lower edge of which has teeth 156 meshing with pinion 157 fast to the inner end of stub shaft 158. The outer end of shaft 158 carries an arm 159 which is pivotally connected to link 57. Link 57 is normally held downwardly by spring 58 (Figs. 1 and 2) and thus maintains the locking mechanism ineffective so long as the start grader feeler 414ª (Figs. 1 and 2) is in lowered position. It will be noted that in this position the release bar 155 is held in engagement with the rollers 151 so that they permit the control bar 444 to be moved by spring 463 to the left of Fig. 1, to a position determined by the position of bridge 120. When the start grader feeler 414ª is raised by a sole passing through the machine, the rock shaft 55 is rotated, raising link 57 and causing withdrawal of the release bar 155 from the rollers 151, and locking the bar 444 against movement toward the left of Fig. 1, which preserves the minimum measurement detected by the calipering rolls 2, 2ª. So long as the feeler 414ª is maintained in elevated position, the bar 444 remains locked for unidirectional movement.

It will be understood that the movement of bar 444 is directly proportional to the thickness of the thinnest spot of the marginal blank area as determined by either of the two calipering devices. This movement of switch control bar 444 may be several times the corresponding movement of the calipering rolls 2, depending on the gear ratios of the transmitting mechanism.

Arm 159 also operates a switch 412ª which is closed when feeler 414ª is raised and opens with link 57 and arm 159 descending.

*Grading mechanism.*—As the forward end of the blank, held by presser bar 3 firmly in engagement with the traveling conveyor 3ª, approaches the skiving rolls 4 and 4ª, it may operate a marking or stamping wheel of known construction, for example of the type described in the above copending application. The machine herein described by way of example has instead an indicator 300 (Fig. 2) with hand 301 and scale 302. During the operation of the machine a slide bar 63 (Figs. 1 and 2) controlling the indicating as well as the skiving mechanisms, is adjusted endwise and set in response to and in accordance with the thickness of the thinnest part of the blank as determined by the measuring mechanism, in the manner described below.

The upper skiving roll 4 (Figs. 1 and 2) is suitably mounted in bearing boxes 64 (Fig. 2) to move in vertical ways 67 on the frame of the machine. Each bearing box 64 is provided upon its top side, as usual in such machines, with a wedge block 65 (Figs. 1 and 2) cooperating with a similar inverted wedge block 66 adjustably secured to the under side of slide bar 63, as described in detail in the above copending application and schematically indicated in Fig. 1. The lower skiving roll 4ª is journaled in bearing boxes which are also mounted to slide in vertical ways and are yieldingly supported by a pair of stiff springs, one of which is indicated at 69 in Figs. 1 and 2. To a bearing box 64 of upper skiving roll 4 is fastened a link 305 to which is at 306 hinged a two-armed lever 307 pivoted at 308 and with its other end fastened to a rod 309 (Fig. 2) connected to hook 1ᵇ of the above-described feeding device.

When the forward end of a blank enters between the skiving rolls 4 and 4ª, the transverse slide bar 63 having previously been adjusted by the measuring mechanism in accordance with the thickness grade of that blank in the manner to be described below, the upper roll 4 is lifted until its pair of wedge blocks or abutments 65 engage and are stopped by the pair of abutments 66 on slide bar 63. The distance between roll 4 and the edge of the knife blade 5 (Figs. 1 and 2) now corresponds to the thickness of the thinnest spot of the blank as determined by the measuring mechanism and determines the thickness to which the blank will be evented or skived. Thicker areas of the blank will force the lower roll 4ª downwardly against the pressure of springs 69 and will be skived off by the knife 5. While a blank is between the two skiving rolls, rod 305 is raised and rod 309 with hook 1ᵇ lowered, preventing the feeding of a blank. As soon as the blank leaves the grading mechanism, hook 1ᵇ is lifted and permits entry of another blank.

*Setting and transmission apparatus.*—The slide bar 63 has a rack of teeth 70 meshing with a pinion 471 fixed to the upper end of a vertical shaft 472 journaled in bearings on the machine frame (Figs. 1 and 2). At the lower end of shaft 472 is fixed a pinion 473 meshing with a rack bar 474. This rack bar 474 is mounted in ways on the machine frame and correlated to a switch bar 409 which is mounted to slide on ways on the other side of the machine frame. This correlation is provided by gear sectors 406 and 408 on a shaft 407 (Figs. 1, 2 and 3) and meshing with rack teeth on the lower edges of bars 474 and 409, respectively.

The grading bar 63 on the one hand and the switch bar 409 on the other hand are adapted to be driven by an electromotor 500, for example a commutator motor with exciter winding 501, which is geared to shaft 407 by means of worm wheel 506, worm 507 (Figs. 1, 2 and 3) and gear box 508 (Figs. 2 and 3). The motor runs at a high rate of speed, the above-described gear arrangement providing the comparatively low speed at which rods 409 and 474 are to be moved. Also, the motor is comparatively powerful with regard to the work it has actually to perform, so that it will practically instantaneously attain full speed upon being connected to its current source. A continuously effective brake 511 is provided on motor shaft 512 in order to stop the motor immediately upon discontinuance of energy supply thereto. Due to these provisions the transient periods at the beginning and end of the running periods of the motor will be negligible and these running periods themselves as short as possible under any given condition.

The motor is controlled by a series of control switches 412, 412ª and 502, and a series of restoring switches 520, 521 and 522.

The stop grader switch 412 is operated by the above-described stop grader feeler 414 which is pivoted at 531 and whose lever 532 causes contact of switch elements 533 and 534 while a blank is beneath the stop grader feeler roll.

Start grader switch 412ª is operated by arm 159 of the measuring mechanism and its elements 535 and 536 remain in contact so long as a sole is beneath start grader feeler 414ª.

Control switch 502 is mounted on a sleeve 540 sliding on switch bar 409 and urged by spring 541 towards a stop 542 of the bar (Figs. 1 and 2). This control switch 502 has a contact element 543 which is fixed to sleeve 540 whereas a movable contact element 544 is placed opposite switch control bar 444 and makes contact with element 543 as soon as touched by bar 444; switch 502 is, like switches 412 and 412ª, of the so-called microswitch type. It will be understood that the various switch elements are properly insulated from their support and that flexible wire connections are provided leading to switch 502 which during operation moves relatively to the machine frame and correlates the controlling member 444 with controlled members 63, 409, 474.

The three control switches 412, 412ª and 502 are connected in series between current supply line $a$ and motor terminal II, in a circuit $a$—412—412ª—502—II.

The restoring switch 520 is normally in the position shown in Fig. 1 and includes a solenoid 524 with terminals $c$, $d$, four contact elements 525, 526, 527, 528 fastened to but insulated from armature 529, and six pairs of contacts $g$, $h$, $i$, $k$, $l$, $m$, $n$, $o$, $p$, $q$, $r$, $s$.

The start restoring switch 521 has an actuator 551 cooperating with finger 552 of grader link 305 and two normally open contacts 553, 554. Downward movement of link 305 depresses actuator 551 and momentarily depresses switch element 553 to make contact at 554, whereas further downward and upward movement of 305 have no effect upon switch 521.

The stop restoring switch 522 has a fixed contact 556 and a movable contact 557 which are normally closed. An arm 558 fixed to bar 474 opens this switch if the bar reaches a certain point in its movement towards the left in Fig. 1.

The restoring switches are connected as follows. The start restoring switch 521 normally separates contact $r$ and solenoid terminal $c$ of switch 520 from line terminal $b$. The stop restoring switch 522 normally connects contact $q$ of switch 520 and solenoid terminal $d$ to line terminal $a$. Contacts $g$, $i$, $p$ of the restoring switch 520 are connected to motor terminal II; contacts $l$ and $n$ are connected to line terminal $b$ and motor terminal I; contacts $h$ and $o$ are connected to exciter terminal III; contacts $k$ and $m$ are connected to exciter terminal IV; contact $q$ is connected to solenoid terminal $d$ and switch 522; contact $r$ is connected to solenoid terminal $c$ and switch 521; and contact $s$ is connected to line terminal $b$.

*Operation.*—A blank S fed past lifted hook 1ᵇ (Fig. 2) into the nip of feed rolls 1, 1ª will be seized by these rolls and advanced along conveyor chain 3ª, lifting stop grader feeler 414 and closing switch 412.

The blank then arrives between the two pairs of calipering rolls, lifting spindle 105 and permitting spring 463, which is weaker than spindle spring 119, to lift bridge 120 by moving switch control bar 444 towards the left of Fig. 1, and rack 134 upwardly; feeler 414ª is at that time not yet lifted so that roller 151 is disengaged permitting bar 444 to move in either directon. Switch 412ª is still open due to the lowered position of feeler 414ª so that motor 500 cannot become energized and any measuring movement will not be transmitted to the grading mechanism. The lifting of bridge 120 and the movement of bar 444 towards the left of Fig. 1 permits spring 541 to move switch 502 on its slide 540 towards the left until it reaches stop 542, and the switch itself to open.

As soon as the forward edge of the blank reaches start grader feeler 414ª, the locking mechanism 150—155 is made effective so that from now on only downward movements of bridge 120 (corresponding to diminishing blank thickness) will be transmitted to switch control bar 444. Switch 412ª is closed by the upward movement of link 57.

It will be noted that the distance between rolls 2, 2ª and feeler 414ª determines a non-graded length of forward end of the blank and that this length can be varied by adjusting the position of feeler 414ª on rod 69.

If the calipering rolls 2 now encounter a thinner region of the blank (or if the initial thickness is so small that bar 444 is caused to close switch 502), bridge 120 and rack 134 will move downwardly, bar 444 will push against switch element 544 and move slide 540 towards the right, closing switch 502 by pressing element 544 towards contact 543. Switches 412 and 412ª being at this time also closed, the motor will become energized through circuit a—412—412ª—502—II—500—I—b and immediately begin to rotate shaft 407 with gears 506, 406 and 408, in clockwise direction (Fig. 1). The exciter circuit of the motor is at this stage energized through circuit a—412—412ª—502—II—g—h—III—IV—k—m—l—b. Due to this rotation of the gears on shaft 407, bars 474 and 63 will move towards the right and adjust slide bar 63 and hence the grading mechanism.

This adjustment corresponds to the measurement of the thinnest part of the blank so far encountered by either of the two calipering devices for the following reason: When bar 444 (Fig. 1) moves, it will close contact 543 by pushing against switch arm 544, against the force of spring 541. This closes the above-mentioned motor circuit a—412—412ª—502—500—b, and motor 500 will start. The motor, through gear train 507—506—408—409, moves rack bar 409 toward the right. Bar 444 will cease to press against switch arm 544 as soon as bar 409 has moved far enough to the right to allow switch slide 540, urged towards the left of rod 409 by spring 541, to contact stop 542. As soon as slide 540 is prevented from moving farther to the left on rod 409, arm 544 is released, opening contact 543 of switch 502, and motor 500 stops. Thus, the distance between stop 542 and shaft 407 will always correspond to the length of that portion of bar 444 which extends beyond shaft 142, and hence to the blank thickness. It will be noted that the above arrangement renders the correlation of measuring and grading mechanisms independent of the motor speed, since the positions of these mechanisms depend merely upon the position relatively to the frame of stop 542, and since the transient periods following and preceding the closing and opening, respectively, of switch 502 are negligible.

The grading mechanism will thus closely follow the movement of the measuring mechanism until the rear edge of the blank passes stop grader feeler 414, when switch 412 will open and interrupt the current supply to motor 500, so that the grading mechanism remains from now on at a position corresponding to the minimum thickness of the measured portion of the blank.

It will be noted that a length adjacent the rear end of the blank, corresponding to the adjustable distance from 2 to 414, will not be graded.

The blank now proceeds between presser bar 3 and conveyor 3ª, and when the rear edge of the blank passes start grader feeler 414ª switch 412ª will be opened and control bar 444 released for movement towards the left of Fig. 1.

So long as the locking mechanism 150—151 is effective due to the lifted position of feeler 414ª, the measurement of successively thinner spots in the blank encountered by the calipering rolls 2 and 2ª will be transmitted to the control bar 444 since it is free to respond to any downward movement of the calipering rolls 2 whereas any upward movement of rolls 2 in response to thicker regions of the blank will not be transmitted.

The blank next enters between the feeding and skiving rolls 4 and 4ª whose abutment wedge blocks 66 were adjusted by the slide bar 63 according to the ascertained grade measurement transmitted through bars 444, 409 and 474 with the aid of control switch 502 and motor 500. The minimum blank thickness is indicated on scale 302 by band 301 and the blank itself skived or evened down by knife blade 5 to a uniform thickness corresponding to the ascertained measurement of its thinnest spot.

When the trailing end of the blank passes beyond the skiving rolls the downward movement of roll 4 causes link 305 to descend whereas hook 1ᵇ is again lifted permitting the feeding of another blank.

At the same time switch 521 is momentarily closed, initiating the following resetting operation.

Switch 521 closes circuit a—522—d—524—c—521—b energizing solenoid 524. The solenoid attracts its armature 529 and changes the connections of the twelve contacts of resetting switch 520 to establish the following circuits. Contacts r and s close a holding circuit for solenoid 524 through a—522—524—r—s—b. Contacts g, h and l, m are opened and contacts i, k; n, o; and p, q closed, thereby reversing the exciter winding circuit of motor 500, terminal III now being not connected to line terminal a, but to line terminal b, in the circuit a—522—q—p—i—k—IV—501—III—o—n—b Since switch 502 is by this time open, the motor armature circuit becomes established through a—522—q—p—II—500—I—b, which connection is the same as that prevailing during the measurement transmission period. The exciter winding being reversed, the motor will now run backward and return bars 63, 474 and 409 into initial position.

Switch 502 may be closed and moved towards the right by control bar 444 if a new sole has not yet been inserted between the calipering rolls 2, 2ª, permitting spring 463 to move control bar 444 towards the left of Fig. 1; this, however, is harmless due to the provision of spring 541.

As soon as bars 474 and 409 have reached their normal position, arm 558 opens switch 522 interrupting the motor circuit as well as the holding circuit for solenoid 524 so that the latter returns into normal position and the entire machine is reset and ready for another grading cycle.

It will be understood that a mechanism for normally lifting the calipering rolls, actuated for example by the presser bar, may be provided, as described in my above-mentioned copending application. In that instance, as will now be understood without further explanation, start and stop grader feelers or similar apparatus has to be arranged in such a manner that the motor circuit is established during the entire period when the blank is in the measuring mechanism.

It should be understood that the present disclosure is for the purpose of illustration only and that this invention includes all modifications and equivalents which fall within the scope of the appended claims.

I claim:

1. A grading machine comprising measuring means for continuously detecting changes of thickness of blanks of stock passing therethrough, means for grading said blanks by reducing them to a minimum grade after passing through said measuring means, said grading means being adapted to be adjusted in accordance with said changes, and motor means controlled by said measuring means for supplying power to said grading means to adjust it proportionate to every decrease of thickness towards said minimum.

2. A grading machine comprising detecting means to measure the thickness grades of blanks of stock passing therethrough and having a controlling member moving in response to decreases of said grades, grading means for reducing said blanks to a minimum grade after passing through said detecting means, said grading means being adapted to be set in accordance with said grades, a power supply source, motor means adapted for energization from said source, power transmission means adapted for actuation by said motor means for setting said grading means, and means for energizing said motor means from said source in response to each movement of said controlling member for actuating said transmission means and setting said grading means proportionate to said grade decreases.

3. A grading machine comprising detecting means to measure the thickness grades of blanks of stock passing therethrough, grading means adapted to be set in accordance with said grades, a setting mechanism having a controlling member moved by said detecting means in accordance with each variation of said grade only in one sense, a power supply source, motor means adapted for energization from said source, power transmission mechanism adapted for actuation by said motor means for adjusting said grading means, and means for energizing said motor means from said source in response to each movement of said controlling member for actuation of said transmission mechanism and adjustment of said grading means proportionate to the largest of said variations.

4. A grading machine comprising detecting means to measure the thickness grades of blanks of stock passing therethrough and having a movable controlling member following only decreases of said grades, grading means for reducing said blanks to a minimum grade after passing through said detecting means, said grading means being adapted to be set in accordance with said grades, a power supply source, motor means adapted for energization from said source, power transmission mechanism for setting said grading means and adapted for actuation by said motor means, and means for energizing said motor means from said source under control of the movement of said controlling member for setting said grading means proportionate to said grade decreases.

5. A grading machine comprising detecting means to measure the thickness grades of blanks of stock passing therethrough, grading means adapted to be set in accordance with the thickness grades of said blanks, a setting mechanism having a controlling member moving in response to said detecting means continuously to assume positions corresponding to unidirectional changes of said grades, an electric power supply source, an electromotor in a circuit including said source, power transmission mechanism for adjusting said grading means in accordance with said grades and adapted for actuation by said motor, normally open switching means in said circuit arranged for movement with said transmission mechanism and closure by said controlling member in order to energize said motor from said source, and means for disassociating said controlling member and said switching means at a position corresponding to a setting mechanism position proportionate to the preceding unidirectional change.

6. A grading machine comprising detecting means to measure the thickness grades of blanks of stock passing therethrough having a controlling member moving in response to variations of said grades, grading means adapted to be set in accordance with said grades, an electric power supply source, an electromotor in a circuit including said source, transmission mechanism for adjusting said grading means in accordance with said movement of said controlling member and adapted for actuation by said motor, normally open switching means in said circuit arranged to be closed by said movement for energization of said motor, a second normally open switching means in series with said switching means, and feeler means arranged at a certain distance from said detecting means and closing said second switching means upon contact with a blank, said second switching means conditioning said circuit for energization of said motor upon closure of said first switching means.

7. A grading machine comprising detecting means to measure the thickness grades of blanks of stock passing therethrough having a controlling member moving in response to variations of said grades, grading means adapted to be set in accordance with said grades, an electric power supply source, an electromotor in a circuit including said source, transmission mechanism for adjusting said grading means in accordance with said movement of said controlling member and adapted for actuation by said motor, normally open switching means in said circuit arranged to be closed by said movement for energization of said motor, means for disassociating said controlling member and said switching means thereby stopping said motor upon actuation of said transmission mechanism proportionate to said movement, and means actuated by said grading means for reversing said motor and resetting said transmission mechanism upon termination of the grading of a blank.

8. A grading machine comprising detecting means to measure the thickness grades of blanks of stock fed therethrough having a switch control member adapted to progress in one direction to amounts proportionate to the decrease of said grades, grading means adapted to be set in accordance with said grades, a source of electric current, an electromotor in a circuit including said source, transmission mechanism for adjusting said grading means and adapted for actuation by said motor, a switch in said circuit normally open and ready to be closed by said control member progressing in said direction, a switch carrier yieldingly supporting said switch and coupled to said motor for moving it in said direction to amounts proportionate to the actuation of said transmission mechanism by said motor, said switch carrier moving said switch away from said control member to amounts proportionate to said decrease thereby interrupting said circuit and arresting said motor when said grading means is adjusted proportionate to said decrease.

ARTHUR G. B. METCALF.